March 28, 1939.  C. B. SADTLER  2,152,284
METHOD OF HEAT TREATING AND APPARATUS THEREFOR
Filed March 13, 1936   3 Sheets-Sheet 1
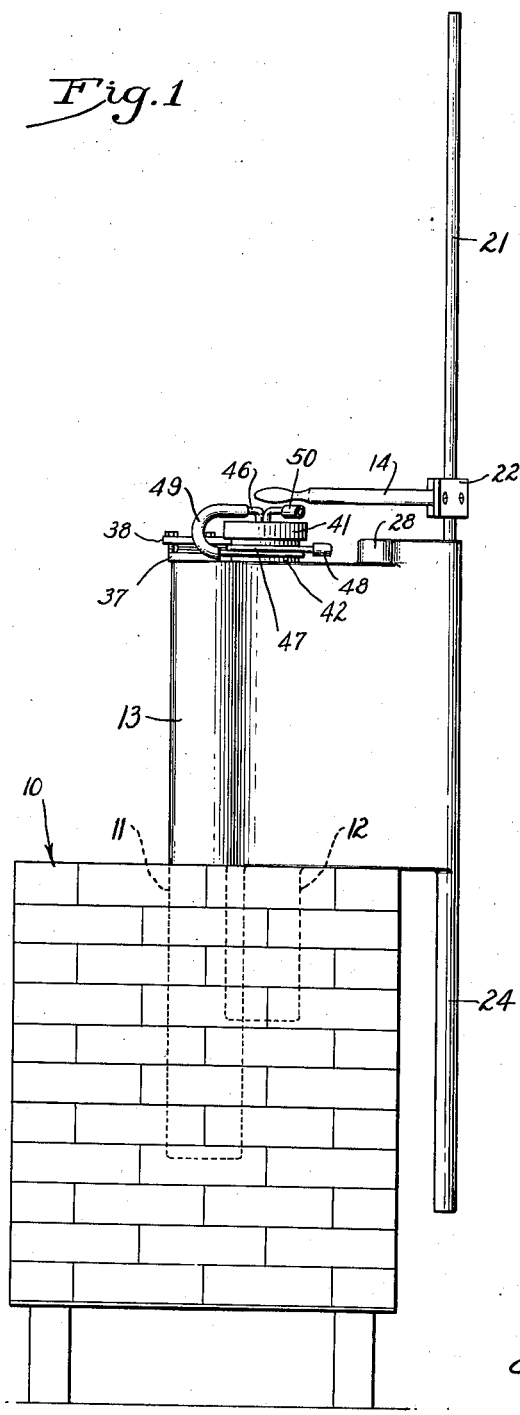
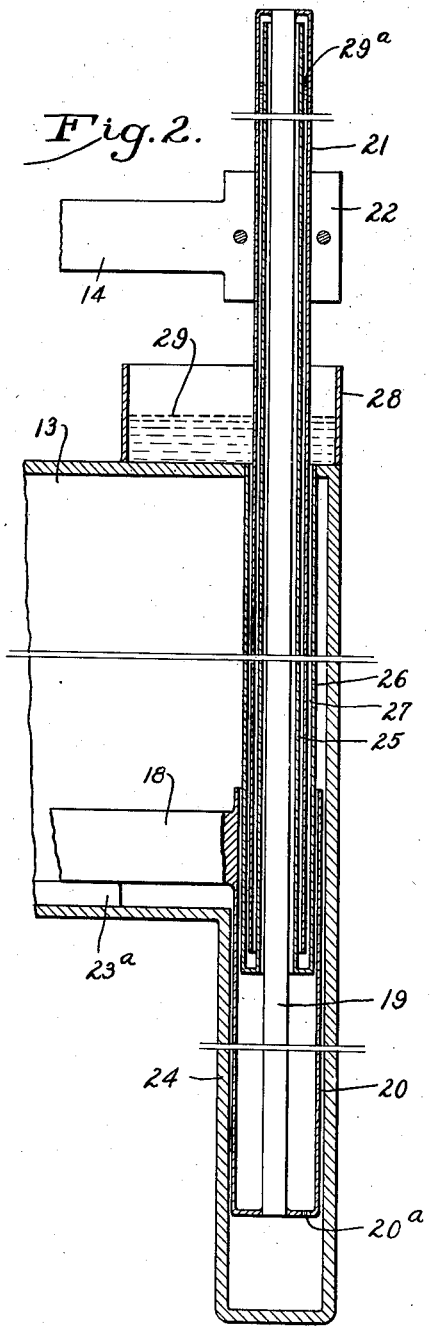
INVENTOR
Chester B. Sadtler
BY
Parker, Carlson, Pitzner & Hubbard
ATTORNEYS March 28, 1939.                C. B. SADTLER                2,152,284
            METHOD OF HEAT TREATING AND APPARATUS THEREFOR
                    Filed March 13, 1936        3 Sheets-Sheet 2
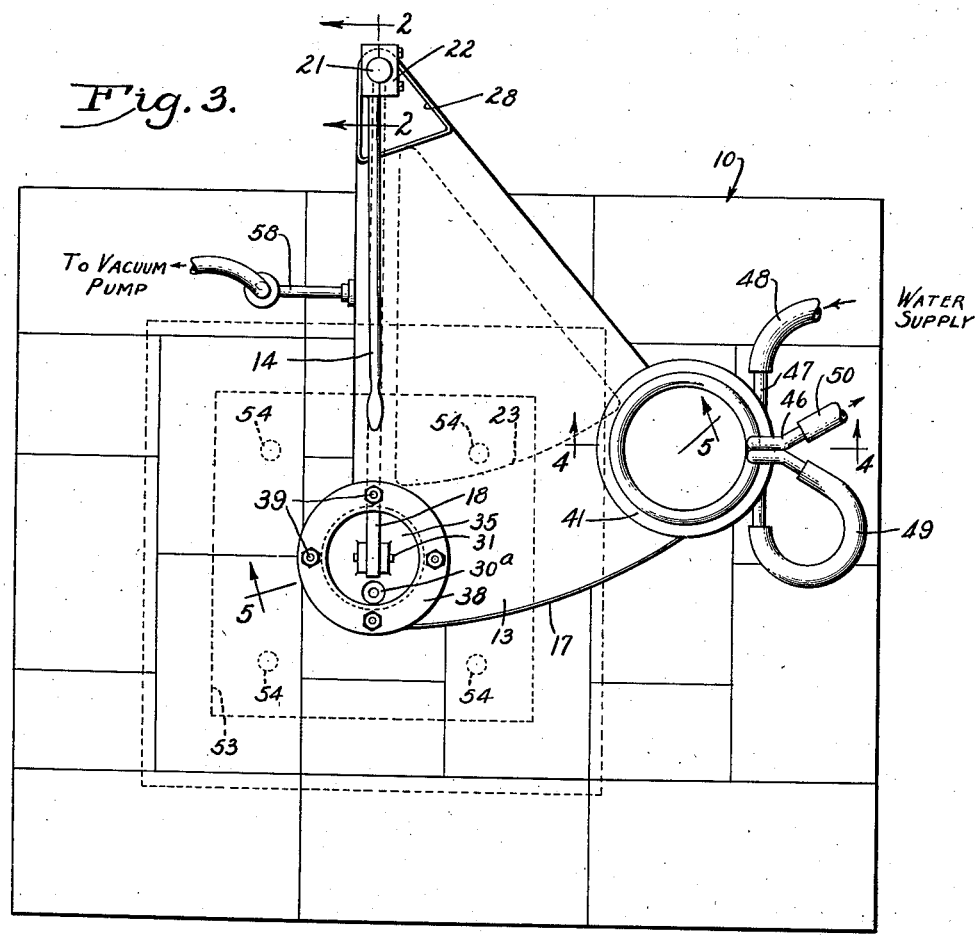
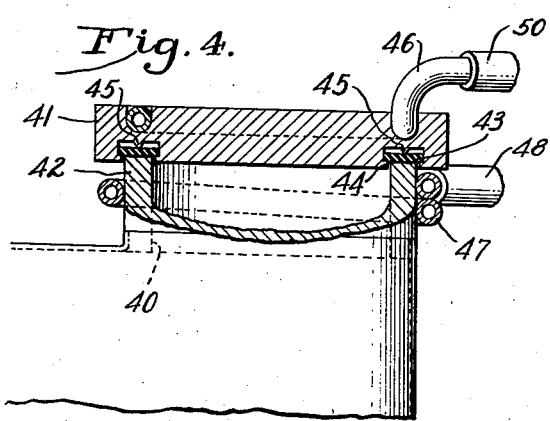
INVENTOR
Chester B. Sadtler
BY
ATTORNEYS March 28, 1939.  C. B. SADTLER  2,152,284
METHOD OF HEAT TREATING AND APPARATUS THEREFOR
Filed March 13, 1936  3 Sheets-Sheet 3

INVENTOR
Chester B. Sadtler
BY
ATTORNEYS

Patented Mar. 28, 1939

2,152,284

UNITED STATES PATENT OFFICE 2,152,284

METHOD OF HEAT TREATING AND APPARATUS THEREFOR

Chester B. Sadtler, Rockford, Ill., assignor to Barber-Colman Company, Rockford, Ill., a corporation of Illinois Application March 13, 1936, Serial No. 68,716

13 Claims. (Cl. 148—21.5)

My invention relates to methods of heat treating high speed steel or the like and to apparatus therefor, and more particularly to methods of heat treating in which the material being treated is subjected to a plurality of different temperatures during the treatment thereof.

For example, tungsten, chromium and vanadium alloy steel, commonly known as high speed steel since it retains its cutting efficiency at dull red heat, should be subjected to a temperature of between 2250 and 2400 degrees F. during the heat treatment thereof in order to improve the physical characteristics thereof. Before being subjected to such a high temperature, however, the steel should be pre-heated to approximately 900 degrees F. in order to avoid thermal shock. Also, the steel should be quenched at a temperature of approximately 900 degrees F. after having been heated to the higher temperature. These various temperatures for the steel can be most effectively and efficiently obtained in a heat treating apparatus by providing separate heating chambers maintained at each of the desired temperatures and by then moving the material to be treated successively to the various chambers. It should be understood that various other metals and the like require heat treatment at a plurality of different temperatures and that my improved heat treating apparatus is also applicable for effecting the desired heat treatment of the same.

It is an object of my invention to provide an improved method of heat treating high speed steel in which the steel is successively subjected to a plurality of different temperatures while maintaining the same in an evacuated atmosphere both during and between the successive phases of temperature change.

Another object of my invention is to provide an improved heat treating apparatus in which the material to be treated may be maintained at various desired temperatures in separate chambers or containers in which it is protected from the effects of deleterious gases by evacuation of the chambers, the apparatus including an arrangement manipulable from the exterior thereof for moving the material from one chamber to another while still maintaining the same under vacuum.

Another object of my invention is to provide an improved heat treating apparatus including a plurality of evacuated heating chambers, an evacuated transfer chamber forming a closed passage between the heating chambers, a work transfer mechanism for moving material from one container to another through the transfer chamber and an operating mechanism for the work transfer mechanism located exteriorly of the apparatus and connected thereto through an improved type of vacuum tight seal especially adapted to meet the requirements of such an installation.

A further object of my invention is to provide an improved heat treating apparatus including an evacuated container having a high melting point but pervious to gases at high temperature and an improved arrangement for transferring heat to the walls of the container while at the same time protecting the same against contact with the atmosphere.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which:

Figure 1 is a side elevation of a heat treating apparatus embodying my invention.

Fig. 2 is an enlarged sectional side elevation along the line 2—2 in Fig. 3 of a portion of the heat treating apparatus shown in Fig. 1, and illustrates particularly the vacuum tight seal used to maintain a vacuum within the heat treating apparatus during manipulation of the work transfer apparatus.

Fig. 3 is an enlarged plan view of the heat treating apparatus shown in Fig. 1.

Fig. 4 is a detail view, in section along the line 4—4 in Fig. 3, of the hatch or door through which material is placed within the heat treating apparatus and removed therefrom.

Figure 5:
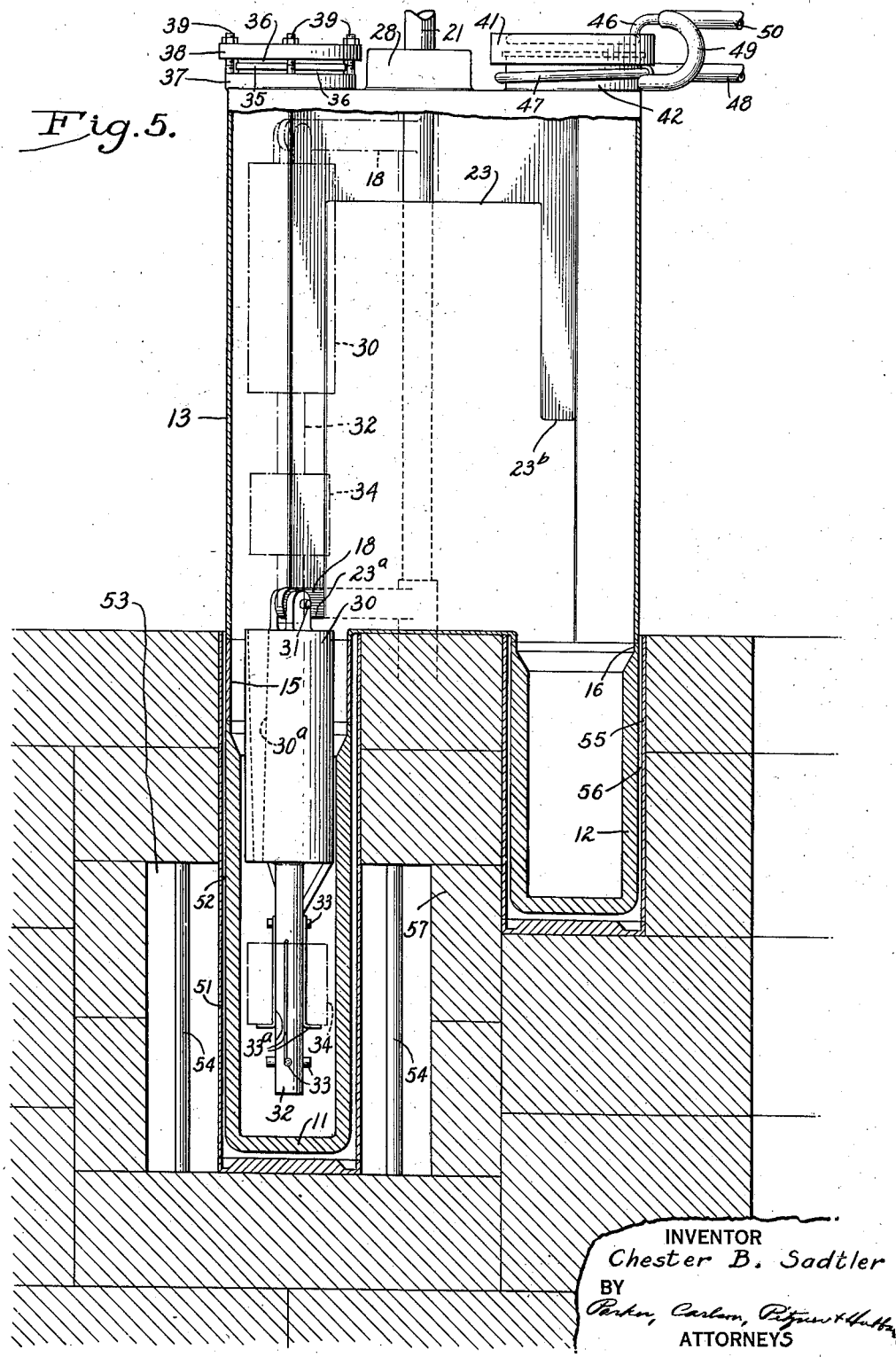
Fig. 5 is an enlarged front elevation, in section along the line 5—5 in Fig. 3, of my improved heat treating apparatus, illustrating particularly the construction of the heating chambers of the heat treating apparatus as well as the transfer mechanism for moving material to be treated from one chamber to another.

Referring to the drawings, I have shown in Fig. 1 a heat treating apparatus which is particularly adapted for heat treating high speed steel in accordance with my improved method as herein described. In general, my improved heat treating apparatus includes as its principal elements an evacuated enclosure, an arrangement for maintaining various portions of the enclosure at different temperatures, and a mechanism manipulable from the exterior of the enclosure to move material being treated from one portion of the enclosure to another.

The particular apparatus illustrated includes a furnace 10 made of a refractory material such as fire brick and provided with heat treating containers 11 and 12, defining a high temperature heat treating chamber and a relatively lower temperature heat treating chamber, respectively. The open upper ends of the containers 11 and 12 communicate with a transfer chamber formed by a segmental shaped enclosing structure 13 which cooperates therewith to form a hermetically sealed enclosure. A transfer mechanism including a manual operating handle 14, manipulable from the exterior of the enclosure, serves to transfer material to be treated from the heat treating container 12 to the container 11 or from the container 11 to the container 12.

As best shown in Fig. 5, the heat treating container 11 is cylindrical in shape and the walls thereof are relatively thick, preferably being made of steel having a low carbon content since such steel also has a comparatively high melting point although it is, at the same time, a good conductor of heat. It has been found, however, that such a container is pervious to gases at high temperatures, which may cause scaling, pitting or decarburization of the material being treated or be otherwise deleterious thereto. I have provided an improved arrangement, which is hereinafter described, for preventing the contact of air or other deleterious gases with the exterior of the container 11 while it is being heated. The upper portion of the walls of the container 11 is formed by a thin walled ring preferably made of a metal of relatively low heat conductivity welded to the upper edge of the container 11, which is beveled to the thickness of the ring 15. As shown in Fig. 5, this thin walled portion 15 of the container 11 extends about half way through the upper wall of the furnace 10. The thin walled portion 15 of the container 11 is a relatively poor conductor of heat as compared to the thick walled lower portion thereof and consequently, limits the amount of heat transferred to the enclosing structure 13 from the container 11.

The heat treating container 12 is also cylindrical in shape and is preferably made of steel having a relatively low carbon content. The container 12 may be made somewhat shallower than the container 11 as shown in Fig. 5, and although the upper portion 16 thereof is reduced in cross section, the length of this thin walled portion 16 is shorter than the portion 15 of the container 11 since the container 12 is not maintained in such a high temperature as the container 11.

The upper edges of the containers 11 and 12 are welded or otherwise hermetically sealed to the adjacent edges of registering openings formed in the bottom wall of the segmental enclosing structure 13. The enclosing structure 13 is provided with an arcuate front wall 17 and the containers 11 and 12 are located adjacent the ends of this arcuate wall. The walls of the enclosing structure 13 are preferably made of steel or the like and may either be cast in the desired shape or fabricated from sheet metal.

The mechanism for transferring material from the container 12 to the container 11, and vice versa, includes a swinging supporting arm or bracket 18, which is pivotally mounted adjacent the apex of the segmental shaped enclosing structure 13. The arm 18 is adapted to swing above the open upper ends of the containers 11 and 12 and to be moved toward and away from the same.

An actuating member 19 is provided with a hermetic or vacuum tight seal which permits movement thereof, preferably both oscillating and axial. I prefer to form this seal by a plurality of relatively telescoping sleeves arranged about the actuating member and a body of sealing liquid arranged between adjacent portions of at least two of the sleeves. In the particular construction illustrated, the rear end of the arm 18 is rigidly connected to the vertically extending actuating member or shaft 19 by a cup shaped member 20. The lower end of the cup shaped member 20 is welded or otherwise rigidly secured to the lower end of the shaft 19 and the arm 18 is welded or otherwise rigidly secured to the upper portion of the sleeve 20 as best shown in Fig. 2. The shaft 19 is rigidly connected to the manual operating handle 14 by an inverted cup shaped member or sleeve 21. The upper end of the sleeve 21 is welded or otherwise rigidly secured to the upper end of the shaft 19 and the rear end of the manual operating handle 14 is rigidly clamped to an intermediate portion of the sleeve 21 by a split clamp 22. The operating handle 14 is preferably alined with the arm 18 so that the position of the operating handle indicates the position of the arm 18 within the enclosing structure 13. It will thus be seen that the shaft 19 and supporting arm 18 may be shifted vertically by vertical movement of the manual operating handle 14 and may also be rotated by rotation of the manual operating handle 14. The lower end of the cup shaped member 20 is journaled in a cylindrical extension 24 formed on the lower side of the enclosing structure 13 in order to facilitate such rotative movement of the shaft 19 and supporting arm 18. A sleeve 25 surrounding the shaft 19 is arranged in telescoping relation with the sleeve 21. The sleeve 25 preferably extends within the enclosing structure 13 in order to minimize the over-all height of the apparatus and its lower end is rigidly secured to the lower end of an outer sleeve 26 which surrounds the lower portion of the sleeve 21 and is welded or otherwise rigidly secured at its upper end to the adjacent edges of an aperture formed in the top wall of the enclosing structure 13. The sleeves 25 and 26 thus form an annular chamber 27 into which the lower portion of the sleeve 21 extends. This annular chamber 27 is maintained substantially full of a sealing liquid such as mercury and the lower portion of the sleeve 21 is immersed in this sealing liquid. In the construction illustrated, an upstanding wall 28 formed on the top wall of the enclosing structure 13 surrounds the sleeve 21 as well as the upper end of the annular chamber 27 and is maintained about half full of mercury 29. This pool of mercury 29 is thus confined about the exterior walls of the sleeve 21 and the annular chamber 27 is maintained full of mercury. When the enclosure 13 is evacuated, atmospheric pressure on the pool of mercury 29 causes the mercury between the sleeves 21 and 25 to rise approximately to the height indicated at 29a. It will thus be seen that the entrance of air or other gases into the interior of the enclosing structure 13 through the aperture therein, through which the shaft 19 extends, is prevented.

In the event of too rapid evacuation of the enclosing structure 13 there is some tendency for the mercury to momentarily surge above the level 29a and flow over the top of the sleeve 25 where it is free to fall into the bottom of the sleeve 20. Consequently I have provided a hole 20ª at the bottom of the sleeve 20 through which the mercury may flow to the bottom of the tubular extension 24 and from which it may be recovered by a suitable drain or syphon arrangement (not shown).

As best shown in Fig. 5, a cylindrical plug or sealing member 30 is supported on the outer end of the supporting arm 18 by a pin 31. The cylindrical member 30 is made of relatively thin sheet steel and is filled with pure quartz sand of about twenty mesh. The cylindrical member 30 thus functions as a heat insulating plug when positioned in the top of the heat treating chamber or container 11 as shown in full lines in Fig. 5. A vertically extending steel tube 32 is secured to the lower end of the cylindrical member 30 and a series of lateral projections 33 are formed on the tube 32. A work piece of material to be treated, such as a hob of high speed steel 34 indicated in dot-dash lines in Fig. 5, is secured to the projections 33 by wires 33ª.

A longitudinally extending aperture 30ª is formed in the cylindrical member 30 in order that the material 34 may be viewed through a window arranged at the top of the enclosing structure 13 while the material is undergoing heat treatment in the container 11. The window for viewing the interior of the container 11 includes a heavy disk of heat resistant glass or similar transparent material 35 arranged between soft lead gaskets 36. The gaskets 36 and disk of glass 35 are arranged on an upwardly extending annular flange 37 formed on the top wall of the enclosing structure 13 and surrounding an aperture therein arranged in alinement with the heat treating container 11. The gaskets 36 and disk of glass 35 are pressed firmly in position on the flange 37 by a ring 38 which is secured to the flange 37 by a series of bolts 39.

A segmental shaped supporting and guiding base 23 is provided within the enclosing structure 13, the side and top walls thereof being spaced firm and arranged substantially parallel with the adjacent walls of the enclosing structure 13 as best shown in Figs. 3 and 5. Laterally extending shoulders 23ª and 23ᵇ are formed on the opposite side walls of the base 23 and serve to support the arm 18 above the containers 11 and 12, respectively. As shown in Fig. 5, the shoulders 23ª and 23ᵇ are spaced a sufficient distance above the adjacent containers that when the arm 18 rests on one or the other of these shoulders, the lower end of the work-support 32 will be positioned a short distance above the bottom of the particular container in which it is located. The central upstanding portion of the base 23 limits the path of lateral movement of the arm 18 so that it is necessary to move it upwardly above the top of the base 23 before it can be moved laterally. The height of the base 23 is sufficient that the arm 18 must be lifted high enough to remove the work-support 32 entirely out of the container before the arm can be moved laterally across the top of the base 23.

Pieces of high speed steel or other material to be treated are introduced into the interior of the heat treating apparatus and removed therefrom through an opening 40 formed in the top wall of the enclosing structure 13 substantially in alinement with the heat treating container 12. As best shown in Fig. 4 this opening 40 is closed by a removable disk shaped metal door or hatch 41. The door 41 rests on an upwardly extending flange 42 formed on the upper wall of the enclosing structure 13 and surrounding the aperture 40 therein. A vacuum tight seal is maintained between the door 41 and the flange 42 by a sealing arrangement including an annular rubber gasket 43 which rests on the upper edge of the flange 42. This upper edge of the flange 42 is ground or otherwise machined smooth and flat so that it is free of scratches or other irregularities. The gasket 43 is positioned in a recessed groove 44 formed in the lower side of the cover 41, the lower edges of the groove 44 extending about the adjacent edges of the flange 42. An annular rib 45 formed at the bottom of the groove 44 presses against the rubber gasket 43 and holds the same firmly against the upper edge of the flange 42.

I have provided an arrangement for cooling the cover or door 41 as well as the flange 42 in order that the rubber gasket 43 will not be burned or the cooperating parts of the cover 41 or flange 42 distorted by heat thus preventing impairment of the vacuum tight seal during the operation of the apparatus. This cooling arrangement includes a steel tube 46 mounted in an annular recess formed in the top of the cover 41 and a helical steel tube 47 which surrounds the flange 42. The tubes 46 and 47 are soldered, brazed or otherwise rigidly secured to the adjacent portions of the cover 41 and flange 42, respectively, in good heat conducting relation therewith. A cooling fluid such as fresh water is supplied to the tube 47 through a flexible conduit or hose 48 and this cooling water after circulating through the tube 47 in heat exchange relation with the flange 42 then passes to the tube 46 through a flexible connecting conduit or hose 49 and then after circulating through the tube 46 in heat exchange relation with the cover 41 is discharged through a flexible conduit or hose 50.

As was noted above, I have provided an improved arrangement for applying heat to the walls of the heat treating containers 11 and 12 which is in turn conducted to the material supported within the containers. This arrangement seals the exterior walls of the heat treating containers 11 and 12 so that they are not in contact with air or other deleterious gases, to which they are pervious at high temperature, while at the same time heat is efficiently conducted to their exterior walls. In general, this arrangement includes a bath of sealing liquid having a relatively high heat conductivity and in which the heat treating containers are immersed. The bath of sealing liquid is confined in a second container or vessel, to the exterior walls of which, heat is applied. Referring particularly to Fig. 5, a cylindrical container 51, preferably made of substantially pure nickel, surrounds the heat treating container 11 in spaced relation thereto. The space between the container 51 and heat treating container 11 is filled with a bath of sealing liquid 52 of relatively high heat conductivity such as boric oxide. It will be seen that the upper end of the container 51 is open to the atmosphere so that excessive pressure will not be exerted thereon upon changes in the volume of the boric oxide 52 with changes in temperature thereof. The lower portion of the container 51 extends into a high temperature heating chamber 53 formed in the furnace 10 and the bottom of the container 51 rests on the bottom wall of this chamber 53. The walls of the container 51 are heated by the heat radiated from resistance type electric heating elements 54 positioned in the chamber 53. The heat thus radiated to the walls of the container 51 is in turn transferred through the boric oxide bath 52 to the walls of the heat treating container 11 and is then radiated to the material 34 positioned therein. In heat treating high speed steel, the interior of the heat treating container 11 is preferably maintained at a temperature of between 2250 and 2400 degrees F.

The heat treating container 12 is provided with a sealing arrangement similar to that described with respect to the container 11. Thus, as shown in Fig. 5, the heat treating container 12 is surrounded by a concentric cylindrical container or vessel 55 made of substantially pure nickel and containing a bath of boric oxide 56. In the particular apparatus illustrated, a limited amount of heat is transferred to the heat treating container 12 through the barrier or partition of refractory bricks 57 from the heating elements 54. The heat treating container 12 is preferably filled with a bath of molten lead which is maintained at a temperature of approximately 900 degrees F. Since the heat barrier 57 interposed between the heating chamber 53 and the container 12 is a relatively poor conductor of heat and since the upper portion of the container 12 is separated from the chamber 53 by an even greater thickness of refractory material, only a limited amount of heat is transferred from the heating elements 54 to the heating container 12 so it is possible to maintain the specified temperature differential between the containers 11 and 12. It will be understood that entirely separate heating elements may be provided for the containers 11 and 12 if so desired.

In the operation of the apparatus described above, material to be treated such as high speed steel, is introduced into the apparatus through the aperture 40 and is secured to the lower end of the tube 32 by wires 33ª. In this insertion operation the plug 30 may be removed from the enclosure or if the hole 40 is made sufficiently larger than the plug 30 the operator may attach the work pieces to the tube 32 while the plug 30 is still in place by inserting them through the clearance space between the edge of the aperture 40 and the side of the plug. The cover 41 is then replaced and the interior of the hermetically sealed enclosure formed by the enclosing structure 13 and containers 11 and 12 is evacuated by a suitable vacuum pump or other evacuating apparatus connected to a conduit 58 which communicates with the interior of the enclosing structure 13. The work piece 34 is immersed in the bath of molten lead in the container 12 by first positioning the supporting arm 18 above the container 12 and then moving the same downwardly by the operating handle 14. After the work piece 34 has been immersed in the bath of molten lead in the container 12 a sufficient time that it has attained approximately the same temperature as that of the bath of molten lead, the manual operating handle is moved upwardly. The shaft 19 and supporting arm 18 are thus moved upwardly, as is the work piece 34, so that the latter is moved out of the container 12. The manual operating handle 14 is then swung in a clockwise direction, as viewed in Fig. 3, so that the work piece 34 is positioned above the high temperature heat treating container 11 in the position shown in dot-dash lines in Fig. 5. The manual operating handle 14 is then moved downwardly so that the work piece 34 is positioned in the high temperature heat treating container 11 and the upper end of the container 11 is substantially closed by the heat insulating plug or cylindrical member 30, as shown in full lines in Fig. 5. The work piece 34 of high speed steel is maintained in this position in the high temperature heat treating container 11 at a temperature of between 2250 and 2400 degrees F. until a maximum solid solution of the hardening constituents of the high speed steel is attained. The temperature of the work piece of high speed steel 34 may be judged by the changes in color thereof as viewed through the window 35 and aperture 30ª in the heat insulating plug 30. After the work piece 34 has been maintained at high temperature in the heat treating container 11 for a sufficient period of time, the manual operating handle 14 is again moved upwardly until the work piece 34 is free of the container 11 and is then swung in a counterclockwise direction, as viewed in Fig. 3, until the work piece is positioned above the container 12. Then, upon downward movement of the manual operating handle 14 the work piece 34 is quenched in the bath of molten lead in the relatively low temperature heat treating container 12. After this quenching of the work piece, it may then be removed from the heat treating apparatus through the aperture 40.

It will thus be seen that I have provided an improved heat treating apparatus in which the material to be treated is maintained under vacuum during the entire heat treatment at a plurality of temperatures. At the same time, the material being treated may be moved between zones of different temperatures by a transfer mechanism which is readily manipulable from the exterior of the apparatus and without affecting the vacuum within the heat treating apparatus.

Although I have shown a particular embodiment of my invention which is especially adapted for the heat treatment of high speed steel, I do not desire my invention to be limited to the particular construction shown and described and I intend, in the appended claims, to cover all modifications within the spirit and scope of my invention.

I claim as my invention:

1. A heat treating apparatus comprising, in combination, a pair of heating containers having openings in the upper portions thereof, means for maintaining said containers at relatively high but different temperatures, an enclosing structure having a transfer chamber formed therein communicating with said openings in said heating containers and cooperating with said heating containers to form a hermetically sealed enclosure, said enclosure having an aperture therein, an actuating member extending into said enclosure through said aperture, means including a supporting member operatively connected to said actuating member for conveying material through said transfer chamber from one of said heating containers to another in response to movement of said actuating member, a plurality of relatively movable telescoping sleeves arranged about said actuating member, and means including a pool of sealing liquid arranged between adjacent portions of at least two of said telescoping sleeves for hermetically sealing said aperture in said enclosure.

2. A heat treating apparatus comprising, in combination, a pair of heating containers having openings in the upper portions thereof, means for maintaining said containers at relatively high but different temperatures, an enclosing structure having a transfer chamber formed therein communicating with said openings in said heating containers and cooperating with said heating containers to form a hermetically sealed enclosure, said enclosure having an aperture therein, an axially shiftable and oscillatable shaft extending into said enclosure through said aperture, means including a supporting member operatively connected to said shaft for conveying material through said transfer chamber from one of said heating containers to another in response to movement of said shaft, a longitudinally extending sleeve secured to said shaft and extending about the same, a second sleeve arranged in telescoping relation with said first named sleeve and secured to said enclosure adjacent said aperture, and means including a pool of sealing liquid arranged between adjacent portions of said telescoping sleeves for hermetically sealing said aperture in said enclosure.

3. A heat treating apparatus comprising, in combination, a plurality of heating containers, means for maintaining at least some of said heating containers at relatively high temperatures, an enclosing structure having a transfer chamber formed therein communicating with each of said heating containers and cooperating therewith to form a hermetically sealed enclosure, said transfer chamber having an aperture therein, an outwardly projecting sleeve positioned in alinement with said aperture, means for confining a pool of sealing liquid about said sleeve, a shaft extending through said sleeve and into said transfer chamber, means including a supporting member operatively connected to said shaft for conveying material through said transfer chamber from one of said heating containers to another in response to movement of said shaft, and means including an inverted cup-shaped member cooperating with said sleeve and said pool of sealing liquid to hermetically seal said aperture, said cup-shaped member being secured to said shaft and extending about said sleeve with the open end thereof immersed in said pool of sealing liquid.

4. A heat treating apparatus comprising, in combination, a plurality of heating containers, means for maintaining at least some of said heating containers at relatively high temperatures, an enclosing structure having a transfer chamber formed therein communicating with each of said heating containers and cooperating therewith to form a hermetically sealed enclosure, said transfer chamber having an aperture therein, an outwardly projecting sleeve positioned in alinement with said aperture, means for confining a pool of sealing liquid about said sleeve, a shaft extending through said sleeve into said transfer chamber, means for supporting said shaft for axial and oscillatory movement thereof, means including a supporting member operatively connected to said shaft for conveying material through said transfer chamber from one of said heating containers to another in response to oscillatory movement of said shaft and for moving material into and out of said heating chambers in response to axial movement of said shaft, and means including an inverted cup-shaped member arranged in telescoping relation with said sleeve and cooperating with said pool of sealing liquid to hermetically seal said aperture, said cup-shaped member being secured to said shaft and extending about said sleeve with the open end thereof immersed in said pool of sealing liquid.

5. A heat treating apparatus comprising, in combination, a hermetically sealed enclosure defining a segmental shaped transfer chamber having an arcuate wall and depending cylindrical heating chambers communicating with said transfer chamber adjacent the ends of the arcuate wall thereof, means for maintaining said heating chambers at relatively high but different temperatures, said segmental shaped transfer chamber having an aperture therein adjacent the apex thereof, an outwardly projecting sleeve positioned in alinement with said aperture, means for confining a pool of sealing liquid about said sleeve, a shaft extending through said sleeve into said transfer chamber, means for supporting said shaft for axial and oscillatory movement thereof, means including a supporting member operatively connected to said shaft for conveying material through said transfer chamber from one of said heating chambers to another in response to oscillatory movement of said shaft and for moving material into and out of said heating chambers in response to axial movement of said shaft, and means including an inverted cup-shaped member arranged in telescoping relation with said sleeve and cooperating with said pool of sealing liquid to hermetically seal said aperture, said cup-shaped member being secured to said shaft and extending about said sleeve with the open end thereof immersed in said pool of sealing liquid.

6. A heat treating apparatus comprising, in combination, a hermetically sealed enclosure defining a segmental shaped transfer chamber having an arcuate wall and depending cylindrical heating chambers communicating with said transfer chamber adjacent the ends of the arcuate wall thereof, means for maintaining said heating chambers at relatively high but different temperatures, said segmental shaped transfer chamber having an aperture therein adjacent the apex thereof, a shaft extending through said aperture into said transfer chamber, means for supporting said shaft for axial and oscillatory movement thereof, means including a supporting member operatively connected to said shaft for conveying material through said transfer chamber from one of said heating chambers to another in response to oscillatory movement of said shaft and for moving material into and out of said heating chambers in response to axial movement of said shaft, means including a heat insulating plug carried by said supporting member and movable into and out of the open end of at least one of said heating chambers for minimizing the transfer of heat therefrom when material is positioned therein for heat treatment, and means cooperating with said shaft for hermetically sealing said aperture in said enclosure.

7. A heat treating apparatus comprising, in combination, a furnace having a wall of refractory material defining a plurality of heating chambers therein, evacuated heating containers positioned in each of said heating chambers, an enclosing structure having a transfer chamber formed therein communicating with said heating containers and cooperating therewith to define a hermetically sealed enclosure, heating means for heating one of said containers to a relatively high temperature, means including a partition of refractory material interposed between said one container and another of said containers for transferring a lmited amount of heat from said heating means to said last named container to maintain said last named container at a relatively lower temperature, and means operable from the exterior of said enclosure for transferring material from one of said heating containers through said transfer chamber to another of said heating containers.

8. A heat treating apparatus comprising, in combination, a plurality of heating containers, the walls of said containers having a relatively high melting point but being pervious to gases at high temperatures, sealing vessels extending about said heating containers, baths of sealing liquid of relatively high heat conductivity in said sealing vessels in which said heating containers are immersed, thereby hermetically sealing the pervious walls of said heating container while forming an effective heat transfer path thereto, means for supplying heat to the exterior walls of said sealing vessels, an enclosing structure having a transfer chamber formed therein communicating with each of said heating containers and cooperating therewith to form a hermetically sealed enclosure, and means operable from the exterior of said enclosure for transferring material from one of said heating containers through said transfer chamber to another of said heating containers.

9. A heat treating apparatus comprising, in combination, a container for material to be treated and adapted to be evacuated, the walls of said container having a relatively high melting point but being pervious to gases at high temperatures, a vessel extending about all of the heated wall portions of said first named container, a bath of sealing liquid of relatively high heat conductivity in said vessel in which said first named container is immersed, thereby hermetically sealing the pervious walls of said heating container while forming an effective heat transfer path thereto, and means for supplying heat to the exterior walls of said vessel.

10. A heat treating apparatus comprising, in combination, a container for material to be treated and adapted to be evacuated, the walls of said container having a relatively high melting point but being pervious to gases at high temperatures, a vessel extending about all of the heated wall portions of said first named container, a bath of boric oxide in said vessel, in which said first named container is immersed, thereby hermetically sealing the pervious walls of said heating container while forming an effective heat transfer path thereto, and means for supplying heat to the exterior walls of said vessel.

11. A heat treating apparatus comprising, in combination, a container for material to be treated and adapted to be evacuated, the walls of said container having a relatively high melting point but being pervious to gases at high temperatures, a vessel of substantially pure nickel extending about all of the heated wall portion of said first named container, a bath of boric oxide in said vessel in which said first named container is immersed, thereby hermetically sealing the pervious walls of said heating container while forming an effective heat transfer path thereto, and means for supplying heat to the exterior walls of said vessel.

12. A heat treating apparatus comprising, in combination, a container made of steel having a relatively low carbon content and adapted to be evacuated, the walls of said container being pervious to gases at high temperatures, a vessel of substantially pure nickel extending about all of the heated wall portions of said first named container, a bath of boric oxide in said vessel in which said first named container is immersed, thereby hermetically sealing the pervious walls of said heating container while forming an effective heat transfer path thereto, and means for supplying heat to the exterior walls of said vessel.

13. A method for heat treating high speed steel which comprises subjecting a steel article to the successive temperature phases of, preheating to a low temperature, heating to a high temperature, and quenching, all in an evacuated atmosphere, and maintaining the atmosphere about the steel article at substantially the same low pressure both during and between said phases.

CHESTER B. SADTLER.